(12) United States Patent
Azegami et al.

(10) Patent No.: US 9,821,383 B2
(45) Date of Patent: Nov. 21, 2017

(54) BALL END MILL

(71) Applicant: MITSUBISHI MATERIALS CORPORATION, Tokyo (JP)

(72) Inventors: Takayuki Azegami, Akashi (JP); Tarou Abe, Akashi (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 456 days.

(21) Appl. No.: 14/388,484

(22) PCT Filed: Mar. 13, 2013

(86) PCT No.: PCT/JP2013/056907
§ 371 (c)(1),
(2) Date: Sep. 26, 2014

(87) PCT Pub. No.: WO2013/146238
PCT Pub. Date: Oct. 3, 2013

(65) Prior Publication Data
US 2015/0056027 A1    Feb. 26, 2015

(30) Foreign Application Priority Data

Mar. 29, 2012  (JP) ................................ 2012-077249

(51) Int. Cl.
*B23C 5/10* (2006.01)
(52) U.S. Cl.
CPC ...... *B23C 5/1009* (2013.01); *B23C 2210/205* (2013.01); *B23C 2210/285* (2013.01);
(Continued)
(58) Field of Classification Search
CPC ........ B23C 2210/285; B23C 2210/287; B23C 2210/54; B23C 5/1009; B23C 5/10; B23C 5/1081; B23C 5/28
See application file for complete search history.

(56) References Cited

U.S. PATENT DOCUMENTS 5,779,399 A * 7/1998 Kuberski .................. B23C 5/10
  407/54
5,833,402 A   11/1998 Martin
(Continued)

FOREIGN PATENT DOCUMENTS

DE    102005043841 A    3/2007
JP    2003-039223 A    2/2003
(Continued)

OTHER PUBLICATIONS

Extended European Search Report dated Oct. 29, 2015 for the corresponding European Application No. 13770388.0.
(Continued)

*Primary Examiner* — Sara Addisu
(74) *Attorney, Agent, or Firm* — Leason Ellis LLP (57) ABSTRACT

A ball end mill, which includes long and short cutting edges alternately formed, shows excellent chip discharge performance without sacrificing strength. An even number of cutting edges are formed at intervals in a circumferential direction on a front end of an end mill body rotated about an axis and have rotation trajectories formed around the axis that form a hemispherical shape. The cutting edges adjacent to each other in the circumferential direction with one cutting edge interposed are long cutting edges that intersect with each other on the axis. The other cutting edges adjacent to each other in the circumferential direction with one cutting edge interposed are short cutting edges that include inner peripheral ends at positions distant from the axis. A gash of the long cutting edge and a gash of the short cutting edge connect with each other on a front end side of the end mill body.

5 Claims, 6 Drawing Sheets (52) U.S. Cl.
    CPC .... *B23C 2210/287* (2013.01); *B23C 2210/54* (2013.01); *Y10T 407/1948* (2015.01)

(56)           References Cited

U.S. PATENT DOCUMENTS

| | | | |
|---|---|---|---|
| 5,855,458 A * | 1/1999 | Reynolds | B23B 51/02 407/34 |
| 2003/0180104 A1* | 9/2003 | Kuroda | B23C 5/10 407/54 |
| 2012/0170984 A1 | 7/2012 | Azegami | |
| 2015/0030396 A1 | 1/2015 | Abe et al. | |
| 2015/0266113 A1* | 9/2015 | Fukata | B23C 5/10 407/11 |

FOREIGN PATENT DOCUMENTS

| | | | |
|---|---|---|---|
| JP | 2004276142 A * | 10/2004 | |
| JP | 2010-214500 A | 9/2010 | |
| JP | 2011-056649 A | 3/2011 | |
| JP | 2011-183532 A | 9/2011 | |
| JP | 2011-189463 A | 9/2011 | |
| JP | 2012-200836 A | 10/2012 | |
| WO | WO-2013/137021 A | 9/2013 | |

OTHER PUBLICATIONS

International Search Report dated Apr. 9, 2013 for the corresponding PCT Application No. PCT/JP2013/056907.

* cited by examiner

BALL END MILL

CROSS-REFERENCE TO RELATED PATENT APPLICATIONS

This application is a U.S. National Phase Application under U.S.C. §371 of International Patent Application No. PCT/JP2013/056907, filed Mar. 13, 2013, and claims the benefit of Japanese Patent Application No. 2012-077249, filed on Mar. 29, 2012, all of which are incorporated by reference in their entirety herein. The International Application was published in Japanese on Oct. 3, 2013 as International Publication No. WO/2013/146,238 under PCT Article 21(2).

FIELD OF THE INVENTION

The present invention relates to a ball end mill including an even number of cutting edges which are formed at intervals in a circumferential direction on a front end portion of an end mill body rotated about an axis and have rotation trajectories around the axis that form the shape of a hemisphere having a center on the axis.

BACKGROUND OF THE INVENTION

As this type of ball end mill having an even number of cutting edges, JP-A-2011-183532 proposes a ball end mill with six grooves, namely, 6-flute end mill, in which six radial cutting edges are formed on a front end portion of an end mill body, three of the radial cutting edges, which are adjacent to each other in the circumferential direction with one cutting edge interposed therebetween, among the radial cutting edges are long radial cutting edges (long cutting edges) that intersect with each other on the axis on the front end portion of the end mill body, and the other three radial cutting edges are short radial cutting edges (short cutting edges) that include inner peripheral ends at positions distant from the axis.

In this ball end mill, it is possible to easily form long radial cutting edges, which abut against each other on the axis at the front end of the end mill body, on a ball end mill of which all of the six radial cutting edges are long radial cutting edges, and to prevent chip clogging by securing the volume of a pocket that is used to discharge chips. Furthermore, in a ball end mill of which two radial cutting edges in the related art, which are disposed so as to face each other, are long radial cutting edges and the other four radial cutting edges are short radial cutting edges, many long radial cutting edges are present at the front end of the end mill body. Accordingly, it is possible to improve the accuracy of a machined surface and to lengthen the tool life.

Technical Problem

Incidentally, in the ball end mill disclosed in JP-A-2011-183532, a notch surface, which extends in a direction perpendicular to the axis or in a direction that is slightly inclined toward the front end side from the direction perpendicular to the axis as going toward the inner peripheral side, is formed on the inner peripheral side of the front end of the front end flank, which is connected to the short radial cutting edge, in order to position the inner peripheral end of the short radial cutting edge at a position distant from the axis on the front end of the end mill body so that the inner peripheral end of the short radial cutting edge is positioned at an intersecting point among the notch surface, the front end flank, and the wall surface, which faces the end mill rotation direction, of the gash of the short radial cutting edge.

Further, a space, which is receded from the hemisphere formed by the rotation trajectories of the long radial cutting edges, is formed on the inner peripheral side of the inner peripheral end of the short radial cutting edge by the notch surface in addition to three long radial cutting edges, and the volume of the pocket used to discharge chips is ensured even by this space. However, when the notch surface is spread to ensure a larger volume of a pocket, the notch surface reaches the front end flank, which is connected to a portion of the long radial cutting edge present on the front end side of the end mill body. For this reason, the thickness of a rear portion of the end mill body in the end mill rotation direction, namely, the thickness of the back metal, cannot be ensured, particularly, at portions of the long radial cutting edges that intersect with the axis. Accordingly, there is a concern that the strength of cutting edges is reduced and damage or the like to this portion may easily occur.

The invention has been made in consideration of the background, and an object of the invention is to provide a ball end mill that includes long cutting edges (long radial cutting edges) and short cutting edges (short radial cutting edges) alternately formed as described above and can obtain excellent chip discharge performance without sacrificing the strength of cutting edges, particularly, at front end portions of the long cutting edges of an end mill body that intersects with an axis.

SUMMARY OF THE INVENTION

Technical Solution

To solve the above-mentioned problems and to achieve the object, according to an aspect of the invention, there is provided a ball end mill including an even number of cutting edges which are formed at intervals in a circumferential direction on a front end portion of an end mill body rotated about an axis and have rotation trajectories around the axis that form a hemispherical shape having a center on the axis. Among the even number of cutting edges, the cutting edges, which are adjacent to each other in the circumferential direction with one cutting edge interposed therebetween, are long cutting edges that intersect with each other on the axis on the front end portion of the end mill body and the other cutting edges, which are adjacent to each other in the circumferential direction with one cutting edge interposed therebetween, are short cutting edges that include inner peripheral ends at positions distant from the axis. A gash of the long cutting edge and a gash of the short cutting edge, which is adjacent to the long cutting edge in an end mill rotation direction, connect with each other on a front end side of the end mill body, and the gash of the long cutting edge is wider than the gash of the short cutting edge in the circumferential direction on at least the front end side of the end mill body.

In the ball end mill having this structure, as in the ball end mill disclosed in JP-A-2011-183532, the cutting edges, which are adjacent to each other in the circumferential direction with one cutting edge interposed therebetween, are short cutting edges and the gash of the long cutting edge and the gash of the short cutting edge, which is adjacent to the long cutting edge in the end mill rotation direction, connect with each other on the front end side of the end mill body. Accordingly, a space, which is receded from the rotation trajectory of the long cutting edge, is formed on the inner peripheral side of the inner peripheral end of the short cutting edge. Meanwhile, the gash of the long cutting edge is wider than the gash of the short cutting edge in the circumferential direction on at least the front end side of the end mill body. Accordingly, even though the space is not widened forcibly, it is possible to ensure sufficient volume of a pocket for the discharge of chips in the gash of the long cutting edge.

For this reason, it is possible to obtain excellent chip discharge performance, particularly, at front end portions of the long cutting edges of an end mill body that intersects with the axis. Since the size of the notch surface, which is formed on the inner peripheral side of the short cutting edge, is increased to secure the volume of a pocket, which is used to discharge chips by the long cutting edge, as in the ball end mill disclosed in JP-A-2011-183532, it is not necessary to widely notch the front end flank of the long cutting edge at this portion. Accordingly, it is possible to suppress the reduction of the strength of cutting edges by ensuring the thickness of the back metal the end mill body that is connected to the rear side of this portion in the end mill rotation direction. As a result, it is possible to prevent the occurrence of damage or the like. Accordingly, since stable cutting can be performed even though a higher feed is given, it is possible to facilitate machining with high efficiency.

Moreover, when an interval between the long cutting edge and the short cutting edge, which is adjacent to the long cutting edge in the end mill rotation direction, in the circumferential direction is set to be smaller than an interval between the short cutting edge and the long cutting edge, which is adjacent to the short cutting edge in the end mill rotation direction, in the circumferential direction on at least the front end side of the end mill body, it is possible to ensure a larger thickness on the rear side of the long cutting edge of the end mill body in the end mill rotation direction. Accordingly, it is possible to improve the strength of the cutting edge of the long cutting edge even by ensuring the larger thickness, and to reliably prevent the occurrence of damage or the like.

Meanwhile, in order to make the gash of the long cutting edge wider than the gash of the short cutting edge in the circumferential direction on the front end side of the end mill body as described above, the gash of the long cutting edge is made to include a bottom, which extends in a direction where the bottom intersects with a wall surface of the gash of the long cutting edge facing the end mill rotation direction and a wall surface thereof facing a rear side in the end mill rotation direction, or a bottom, which forms the shape of a concave surface coming into contact with these wall surfaces, at a portion where the gash of the long cutting edge is wider than the gash of the short cutting edge in the circumferential direction. Accordingly, the width of the gash of the long cutting edge in the circumferential direction can be increased by the width of the bottom.

Advantageous Effects

As described above, according to the invention, it is possible to ensure excellent chip discharge performance even without increasing the size of the notch surface, which is formed on the inner peripheral side of the short cutting edge, and widely notching the front end flank of the long cutting edge to ensure the volume of a pocket, which is used to discharge chips by the long cutting edge at the front end portion of the end mill body as in the ball end mill disclosed in JP-A-2011-183532. Accordingly, it is possible to prevent damage or the like, which is caused by the reduction of the strength of the cutting edge, by leaving the sufficient thickness of the end mill body on the rear side of the long cutting edge in the end mill rotation direction.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

EXPLANATION OF REFERENCE

1: end mill body
3: cutting edge portion
4: chip discharge groove
5: outer peripheral cutting edge
6: gash
6A: gash of long cutting edge 7A
6B: gash of short cutting edge 7B
6a: wall surface of gash 6 facing end mill rotation direction T
6b: wall surface of gash 6 facing rear side in end mill rotation direction T
6c: bottom of gash 6
7: cutting edge (radial cutting edge)
7A: long cutting edge 7B: short cutting edge
8A: front end flank of long cutting edge 7A
8B: front end flank of short cutting edge 7B
9: notch surface

DETAILED DESCRIPTION OF THE INVENTION

Best Mode for Carrying Out the Invention

Figure 1:
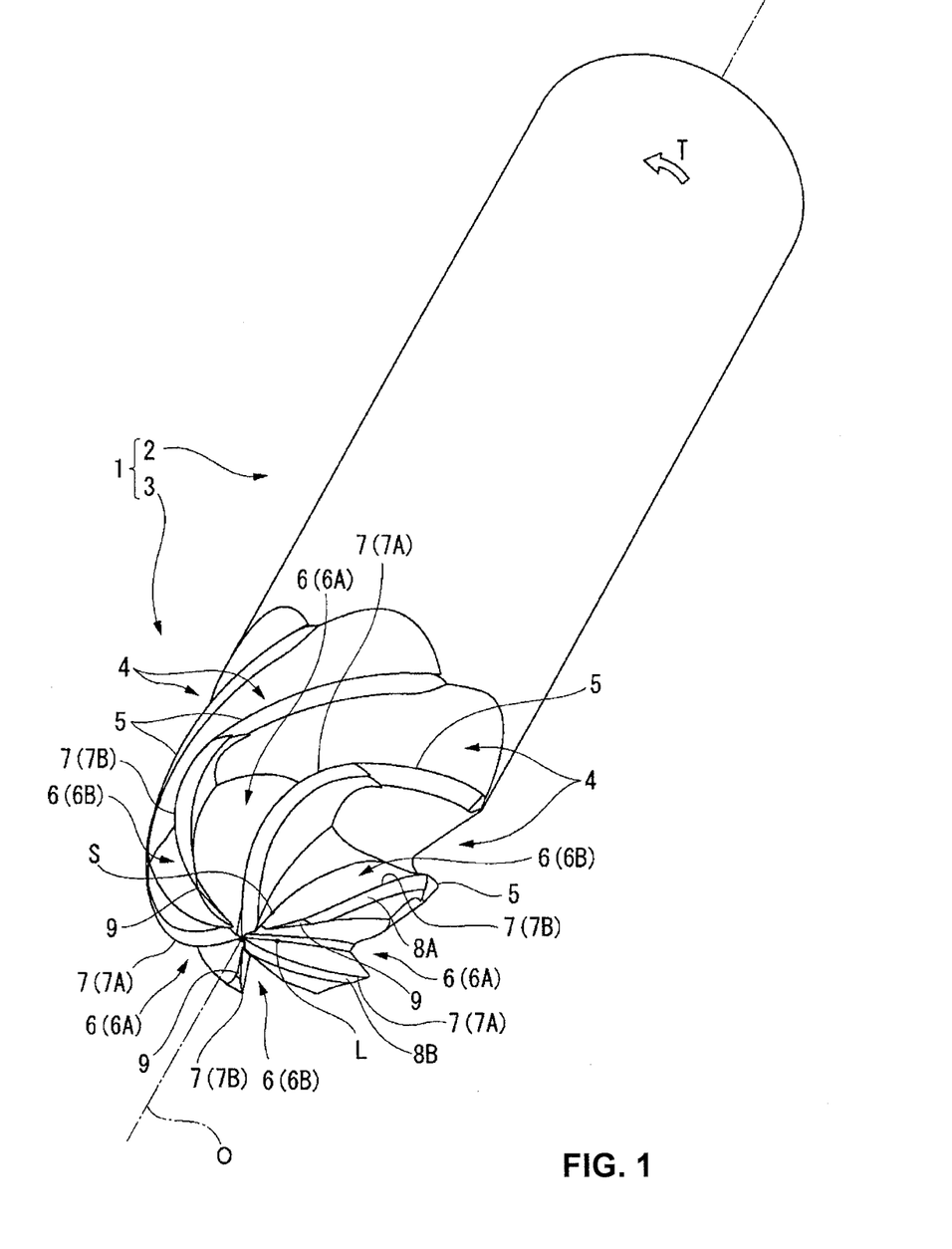
FIG. 1 is a perspective view showing an embodiment of the invention.
Figure 2:
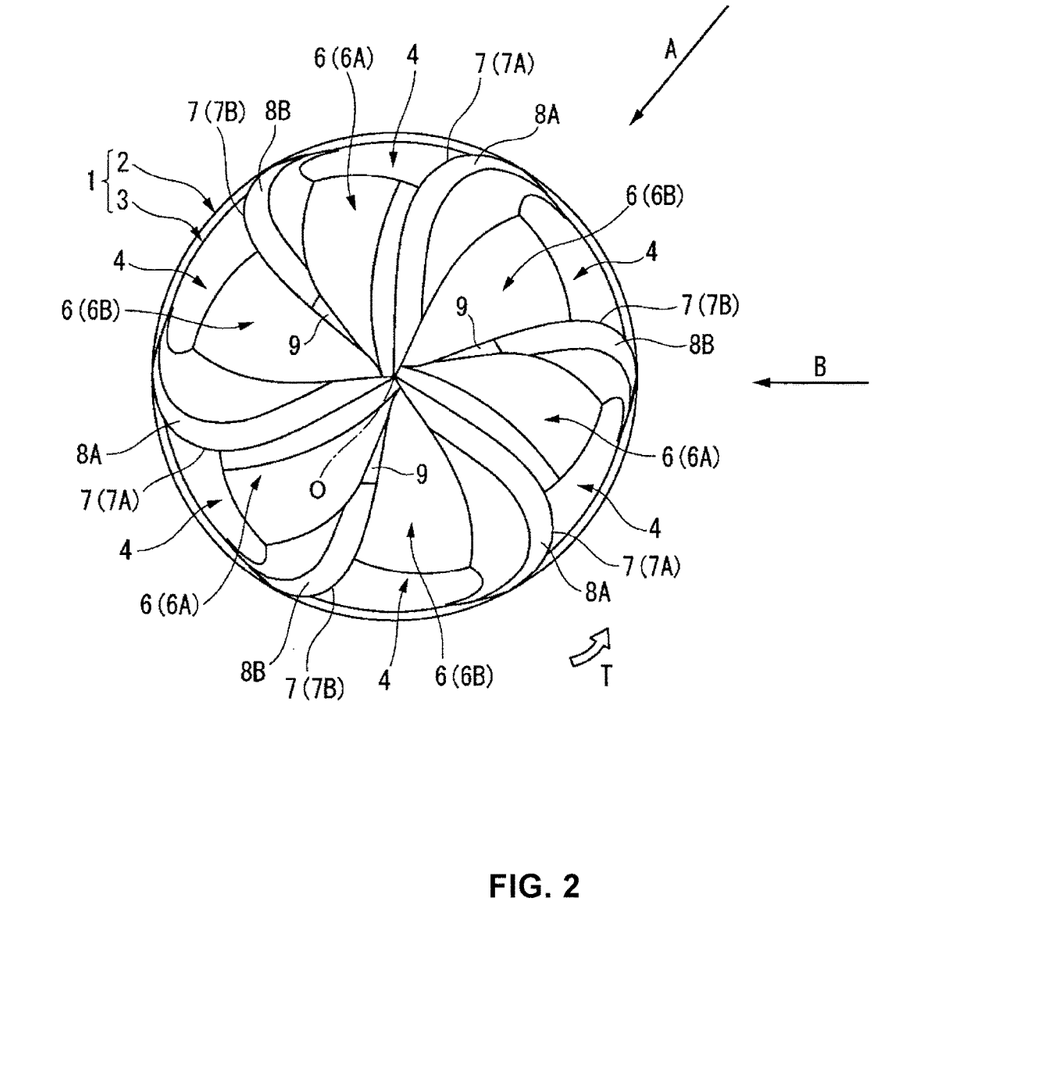
FIG. 2 is an enlarged front view of the embodiment shown in FIG. 1.
Figure 3:
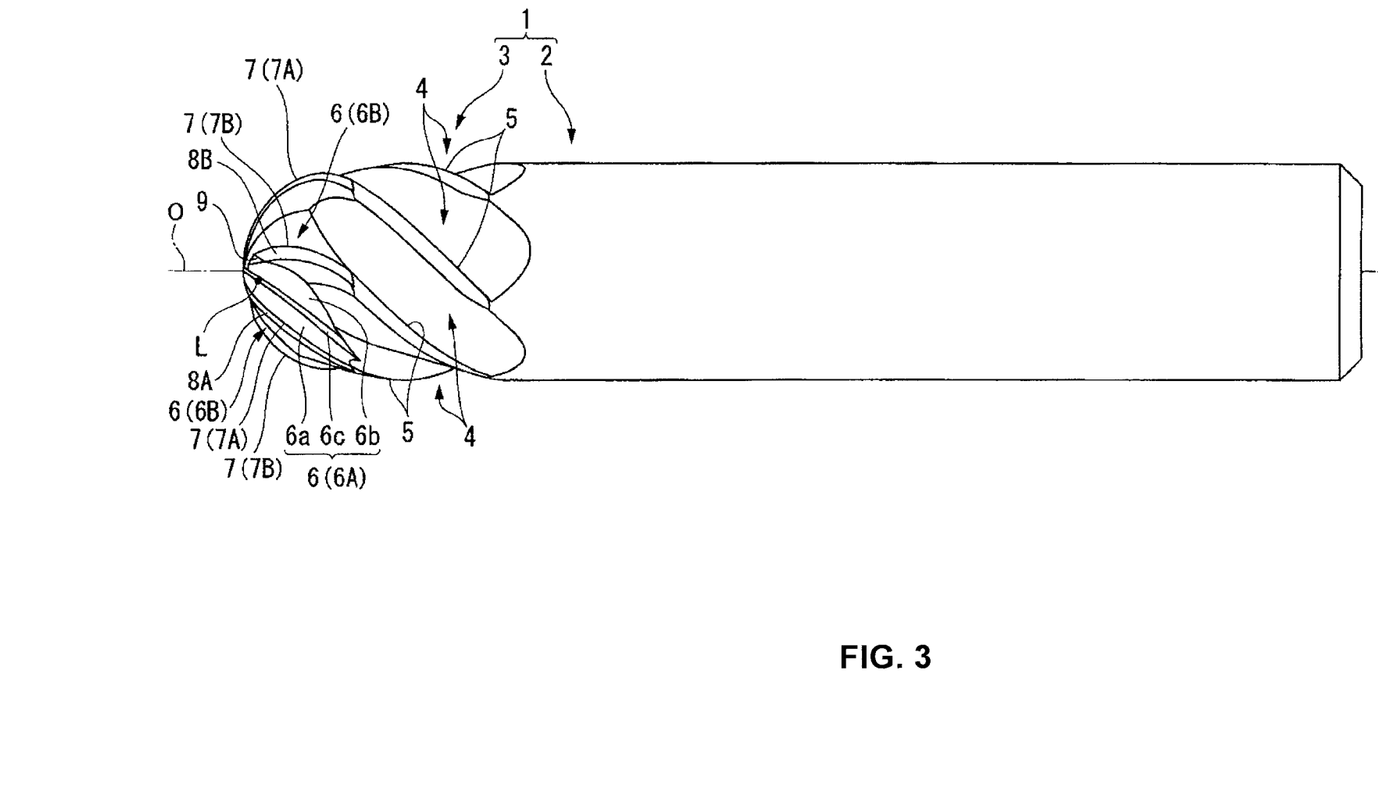
FIG. 3 is a side view seen from a direction A of FIG. 2.
Figure 4:
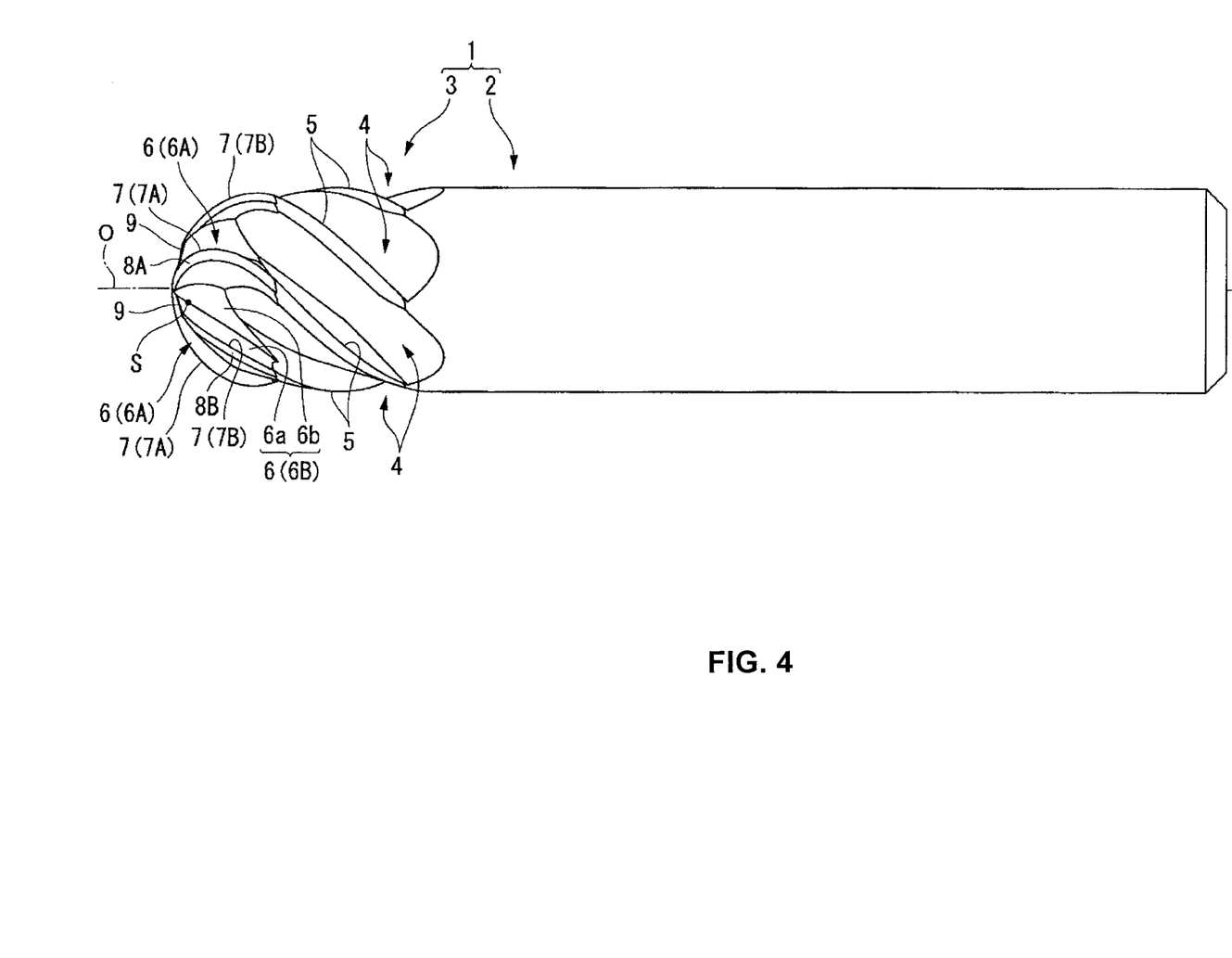
FIG. 4 is a side view seen from a direction B of FIG. 2.
Figure 5:
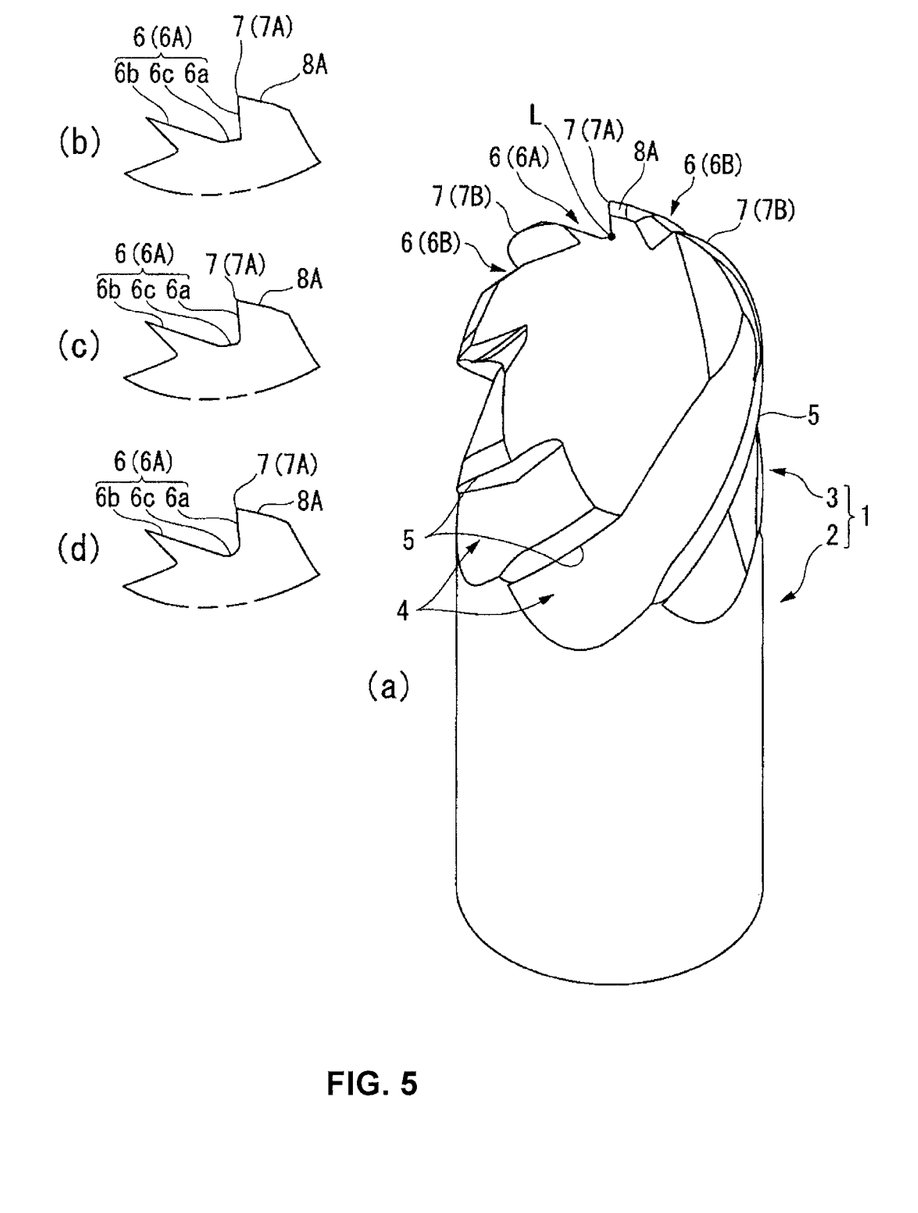
FIG. 5A is a cross-sectional view perpendicular to an intersection ridge between an extended surface of a wall surface, which faces an end mill rotation direction, of a gash of a long cutting edge of a front end side of an end mill body of the embodiment shown in FIG. 1 and an extended surface of a wall surface thereof that faces the rear side in the end mill rotation direction (a cross-sectional view at a point L of FIGS. 1 to 3)
FIG. 5B is an enlarged view of the cross-sectional view shown in FIG. 5A.
FIG. 5C is a cross-sectional view showing a first modification of FIG. 5B.
FIG. 5D is a cross-sectional view showing a second modification of FIG. 5B.
Figure 6:
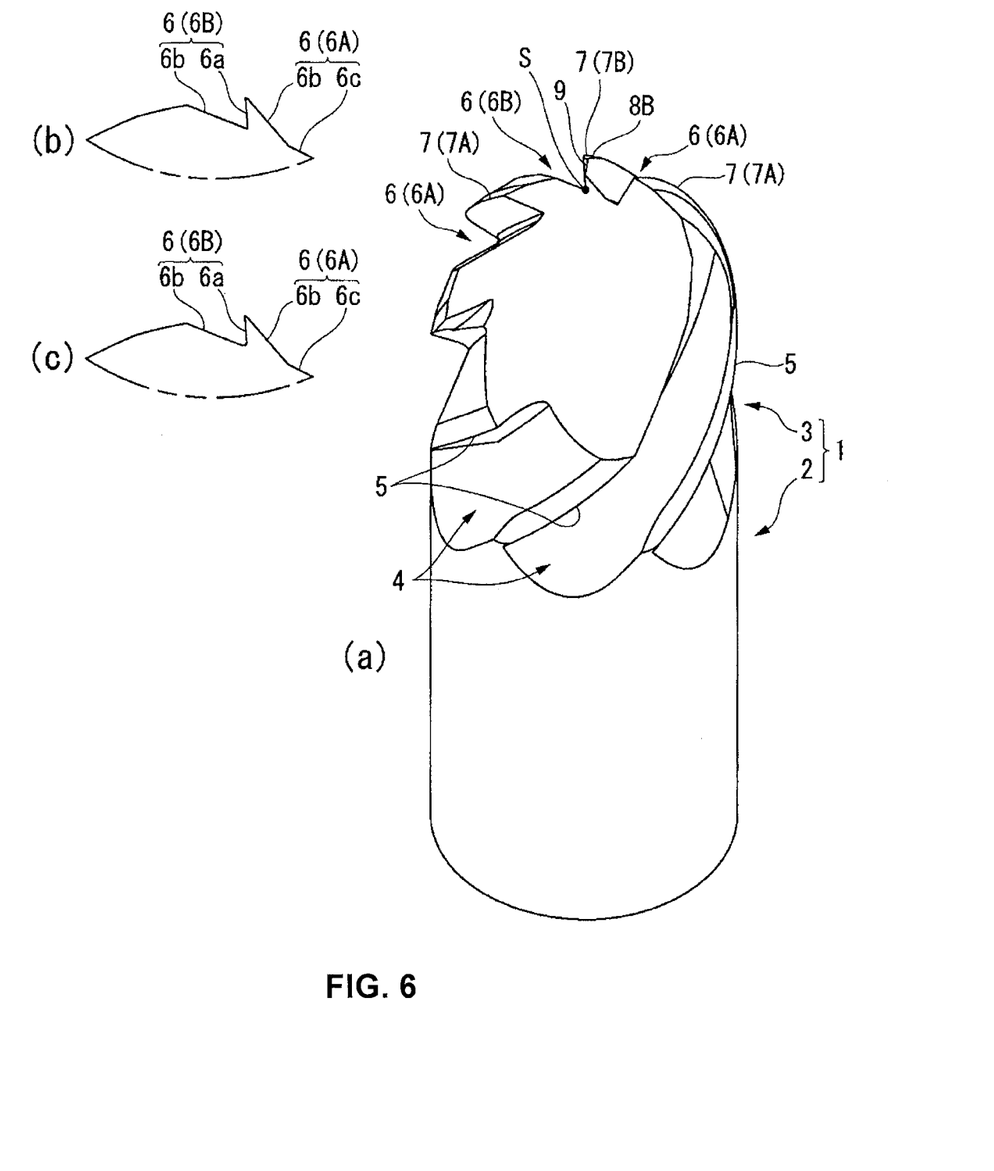
FIG. 6A is a cross-sectional view perpendicular to an intersection ridge between a wall surface, which faces an end mill rotation direction, of a gash of a short cutting edge of the front end side of the end mill body of the embodiment shown in FIG. 1 and a wall surface thereof that faces the rear side in the end mill rotation direction (a cross-sectional view at a point S of FIGS. 1 to 3)
FIG. 6B is an enlarged view of the cross-sectional view shown in FIG. 6A.
FIG. 6C is a cross-sectional view showing a modification of FIG. 6B.

FIGS. 1 to 6 are views showing an embodiment of the invention. In this embodiment, an end mill body 1 is made of a hard material such as cemented carbide and forms a substantially columnar shape having a center on an axis O, a rear end portion (right portion in FIGS. 2 and 3) of the end mill body 1 forms a columnar shank portion 2, and a front end portion thereof forms a cutting edge portion 3. While the shank portion 2 is held on a spindle of a machine tool and the ball end mill is rotated about the axis O in an end mill rotation direction T, the ball end mill is used to cut a curved surface of, for example, a mold or the like by the cutting edge portion 3 as being fed in a direction intersecting with the axis O.

An even number of (six in this embodiment) chip discharge grooves 4 are formed at an outer peripheral portion of the rear end side of the cutting edge portion 3 at intervals in a circumferential direction so as to be twisted toward the rear side in the end mill rotation direction T as the chip discharge grooves go toward the rear end side in a direction of the axis O, and outer peripheral cutting edges 5, which include the wall surfaces as rake faces, are formed at outer peripheral side ridge portions of wall surfaces, which face the end mill rotation direction T, of these chip discharge grooves 4, respectively. Rotation trajectories, which are formed around the axis O, of these outer peripheral cutting edges 5 form one cylindrical surface that has a center on the axis O.

Meanwhile, at the front end portion of the cutting edge portion 3, that is, the front end portion of the end mill body 1, the front end portions of the chip discharge grooves 4 are further notched toward an inner peripheral side as the chip discharge grooves go toward the front end side. As a result, gashes 6 are formed. An even number of (six in this embodiment) cutting edges (radial cutting edges) 7 of which the number is the same as the number of the outer peripheral cutting edges 5 are formed at outer peripheral edge portions of wall surfaces 6a of the gashes 6 facing the end mill rotation direction T, respectively. The cutting edges 7 include wall surfaces 6a as rake faces, are connected to the front ends of the outer peripheral cutting edge 5, and face the inner peripheral side while being convexly curved toward the front end side. Rotation trajectories, which are formed around the axis O, of these cutting edges 7 form one hemisphere that has a center on the axis O and is convex toward the front end side. The radius of the hemisphere is the same as the radius of the cylindrical surface that is formed by the rotation trajectories of the outer peripheral cutting edges 5.

Among these six cutting edges 7, three cutting edges 7, which are adjacent to each other in the circumferential direction with one cutting edge interposed therebetween, are long cutting edges 7A that extend from the front ends of the outer peripheral cutting edges 5 up to the axis O on the front end of the end mill body 1 and intersect with each other on the axis O, and the other three cutting edges 7 are short cutting edges 7B that include inner peripheral ends at positions more distant from the axis O than these long cutting edges 7A. In addition, a gash 6A of the long cutting edge 7A connects with gash 6B of the short cutting edge 7B that is adjacent to this long cutting edge 7A in the end mill rotation direction T. Meanwhile, the three long cutting edges 7A are formed at regular intervals in the circumferential direction, and the three short cutting edges 7B are formed at regular intervals in the circumferential direction.

Further, as shown in FIG. 6B, the gash 6B of the short cutting edge 7B is formed of the wall surface 6a that serves as the rake face of the short cutting edge 7B and faces the end mill rotation direction T, and a wall surface 6b that is opposite to the wall surface 6a and faces the rear side in the end mill rotation direction T. As shown in FIG. 5B, the gash 6A of the long cutting edge 7A is formed of the wall surface 6a that serves as the rake face of the long cutting edge 7A and faces the end mill rotation direction T, and the wall surface 6b that is opposite to the wall surface 6a and faces the rear side in the end mill rotation direction T, and a bottom 6c that extends between these wall surfaces 6a and 6b. Accordingly, on at least the front end side of the end mill body 1, the gash 6A of the long cutting edge 7A is wider than the gash 6B of the short cutting edge 7B in the circumferential direction. That is, the cross-section of the gash 6A of the long cutting edge 7A and the cross-section of the gash 6B of the short cutting edge 7B have shapes different from each other.

Here, in this embodiment, as shown in FIG. 5B, the gash 6A of the long cutting edge 7A is formed so as to extend in a direction where these wall surfaces 6a and 6b intersect with each other at an acute angle in a cross-section that is orthogonal to an intersection ridge between an extended surface of the wall surface 6a facing the end mill rotation direction T and an extended surface of the wall surface 6b facing the rear side in the end mill rotation direction T, and the bottom 6c of the gash 6A extends so as to intersect with these wall surfaces 6a and 6b at angles in the above-mentioned cross-section. Further, as shown in FIG. 6B, the gash 6B of the short cutting edge 7B is formed so that these wall surfaces 6a and 6b intersect with each other at an acute angle in a cross-section that is orthogonal to an intersection ridge between the wall surface 6a facing the end mill rotation direction T and the wall surface 6b facing the rear side in the end mill rotation direction T.

Furthermore, in this embodiment, the wall surface 6b, which faces the rear side in the end mill rotation direction T, of the gash 6A of the long cutting edge 7A connects with the gash 6B of the short cutting edge 7B by extending so as to intersect the wall surface 6b, which faces the rear side in the end mill rotation direction T, of the gash 6B of the short cutting edge 7B around an end of the axis O on the front end of the end mill body 1. As shown in FIG. 6B, the wall surface 6a, which faces the end mill rotation direction T, of the gash 6B of the short cutting edge 7B intersects with the wall surface 6b, which faces the rear side in the end mill rotation direction T, of the gash 6A of the long cutting edge 7A, which is adjacent to the rear side in the end mill rotation direction T, on the outer peripheral side of the intersection ridge between the wall surfaces 6b, which face the rear side in the end mill rotation direction T, of the gash 6A of the long cutting edge 7A and the gash 6B of the short cutting edge 7B. A notch surface 9, which is formed by notching an inner peripheral portion of a front end flank 8B of the short cutting edge 7B in a direction perpendicular to the axis O or in a direction that is slightly inclined toward the front end side from the direction perpendicular to the axis O as going toward the inner peripheral side, is formed on the outer peripheral side thereof. An intersecting point among the notch surface 9, the front end flank 8B of the short cutting edge 7B, and the wall surface 6a of the gash 6B, which serves as the rake face of the short cutting edge 7B, is referred to as the inner peripheral end of the short cutting edge 7B.

Meanwhile, in this embodiment, on at least the inner peripheral side of the front end portion of the end mill body 1 in a range where the short cutting edge 7B is formed in a radial direction with respect to the axis O, an interval between the long cutting edge 7A and the short cutting edge 7B, which is adjacent to the long cutting edge 7A in the end mill rotation direction T, in the circumferential direction is set to be smaller than an interval between the short cutting edge 7B and the long cutting edge 7A, which is adjacent to the short cutting edge 7B in the end mill rotation direction T, in the circumferential direction. Meanwhile, at a portion that is connected to the outer peripheral cutting edge 5 formed on the outer peripheral side, this interval may be set as it is, the long cutting edges 7A and the short cutting edges 7B may be formed at regular intervals in the circumferential direction, and conversely, the interval between the long cutting edge 7A and the short cutting edge 7B, which is adjacent to the long cutting edge 7A in the end mill rotation direction T, in the circumferential direction may be set to be larger than the interval between the short cutting edge 7B and the long cutting edge 7A, which is adjacent to the short cutting edge 7B in the end mill rotation direction T, in the circumferential direction.

Here, when seen from the front end side in the direction of the axis O, the width of the gash 6A of the long cutting edge 7A on the front end side of the end mill body 1 is a width (the length of a circular arc) between the long cutting edge 7A and a line of intersection, which is formed between the wall surface 6b, which faces the rear side in the end mill rotation direction T, of the gash 6A of the long cutting edge 7A and the front end flank 83 or the notch surface 9 of the short cutting edge 73 adjacent to the long cutting edge 7A in the end mill rotation direction T, on the circumference that has a center on the axis O and passes through the inner peripheral ends of the short cutting edges 7B. Likewise, when seen from the front end side in the direction of the axis O, the width of the gash 6B of the short cutting edge 7B on the front end side of the end mill body 1 is a width (the length of a circular arc) between the short cutting edge 73 and a line of intersection, which is formed between the wall surface 6b, which faces the rear side in the end mill rotation direction T, of the gash 6B of the short cutting edge 7B and a front end flank 8A of the long cutting edge 7A adjacent to the short cutting edge 7B in the end mill rotation direction T, on the circumference that has a center on the axis O and passes through the inner peripheral ends of the short cutting edges 7B.

Further, likewise, when seen from the front end side in the direction of the axis O, the interval between the long cutting edge 7A on the front end side of the end mill body 1 and the short cutting edge 7B, which is adjacent to the long cutting edge 7A in the end mill rotation direction T, in the circumferential direction is also an interval (the length of a circular arc) between the long cutting edge 7A and the short cutting edge 7B, which is adjacent to the long cutting edge 7A in the end mill rotation direction T, on the circumference that has a center on the axis O and passes through the inner peripheral ends of the short cutting edges 7B. When seen from the front end side in the direction of the axis O, the interval between the short cutting edge 7B and the long cutting edge 7A, which is adjacent to the short cutting edge 7B in the end mill rotation direction T, in the circumferential direction is also an interval (the length of a circular arc) between the short cutting edge 7B and the long cutting edge 7A, which is adjacent to the short cutting edge 7B in the end mill rotation direction T, on the circumference that has a center on the axis O and passes through the inner peripheral ends of the short cutting edges 7B.

In the ball end mill having this structure, the gash 6A of the long cutting edge 7A is wider than the gash 6B of the short cutting edge 7B in the circumferential direction around the axis O on at least the front end side of the end mill body 1. Accordingly, a large pocket for the discharge of chips can be ensured in the gash 6A of the long cutting edge 7A. For this reason, it is possible to obtain excellent chip discharge performance without spreading the notch surface to the front end flank 8A of the long cutting edge 7A to ensure the volume of the pocket as in the ball end mill disclosed in JP-A-2011-183532, and it is possible to suppress the reduction of the strength of the cutting edge by increasing the thickness of the end mill body 1 on the rear side of the long cutting edge 7A in the end mill rotation direction T.

Furthermore, likewise, since the gash 6A of the long cutting edge 7A connects with the gash 6B of the short cutting edge 73, which is adjacent to the long cutting edge 7A in the end mill rotation direction T, around the axis O on the front end side of the end mill body 1, it is possible to ensure more excellent chip discharge performance. Accordingly, according to the ball end mill having the above-mentioned structure, even though cutting is performed with a higher feed, it is possible to smoothly discharge chips while preventing the occurrence of damage or the like to the long cutting edge 7A. Therefore, it is possible to perform stable cutting with high efficiency.

Moreover, in this embodiment, the interval between the long cutting edge 7A and the short cutting edge 73, which is adjacent to the long cutting edge 7A in the end mill rotation direction T, is set to be smaller than the interval between the short cutting edge 7B and the long cutting edge 7A, which is adjacent to the short cutting edge 73 in the end mill rotation direction T, on at least the inner peripheral side of the front end portion of the end mill body 1. For this reason, at least, in the inner peripheral portion of the range where the short cutting edge 7B is formed in the radial direction with respect to the axis O, it is possible to ensure the larger thickness of the end mill body 1 on the rear side of the long cutting edge 7A in the end mill rotation direction T. Accordingly, it is possible to reliably prevent the occurrence of damage or the like by improving the strength of the long cutting edge 7A.

Meanwhile, in this embodiment, the bottom 6c of the gash 6A of the long cutting edge 7A is formed so as to intersect with the wall surface 6a, which serves as the rake face of the long cutting edge 7A and faces the end mill rotation direction T, and the wall surface 6b, which faces the rear side in the end mill rotation direction T, at angles as shown in FIG. 5B. As in a first modification shown in FIG. 5C, the bottom 6c extends in a direction where the bottom 6c intersects with the wall surfaces 6a and 6b. However, a portion where at least one (both in FIG. 5C) of these wall surfaces 6a and 6b intersects with the bottom 6c may be formed in the shape of a concave surface of which the cross-section forms the shape of a concave curve such as a concave circular arc and which comes into contact with these wall surfaces 6a and 6b and the bottom 6c.

Alternatively, as in a second modification shown in FIG. 5D, the entire bottom 6c may be formed in the shape of a concave surface of which the cross-section forms the shape of a concave curve such as a concave circular arc and which comes into contact with these wall surfaces 6a and 6b, which face the end mill rotation direction T and the rear side in the end mill rotation direction T, of the gash 6A. This is the same even in the case of the gash 6B of the short cutting edge 7B. As in a modification shown in FIG. 6C, the wall surface 6a, which faces the end mill rotation direction T, and the wall surface 6b, which faces the rear side in the end mill rotation direction T, may be formed so as to be connected to each other through a concave surface, which forms the cross-sectional shape of a concave curve coming into contact with these wall surfaces 6a and 6b, in the cross-section. In this case, if the bottom 6c of the gash 6A of the long cutting edge 7A is also a concave surface, the radius of curvature of the bottom 6c in the cross-section may be set to be larger than that of the concave surface of the gash 6B of the short cutting edge 7B.

Meanwhile, in the embodiment, the bottom 6c is formed in the gash 6A over the entire length of the long cutting edge 7A of the cutting edge (radial cutting edge) 7. However, since the interval between the adjacent cutting edges 7 is also increased at a portion that is connected to the outer peripheral cutting edge 5, excellent chip discharge performance is obtained. Accordingly, as long as the gash does not become extremely wide or narrow, the gash 6A of the long cutting edge 7A may not be wide as described above, that is, the bottom 6c may not be formed in the gash 6A of the long cutting edge 7A.

Further, a case in which the invention is applied to a ball end mill with six grooves has been described in the embodiment, but the invention can also be applied to a ball end mill with an even number of grooves of which the number is 8 or more, or a ball end mill with an even number of grooves of which the number is 4 or less. However, since a pocket of the short cutting edge 7B becomes excessively narrow when the invention is applied to a ball end mill with four grooves, there is a problem in terms of chip clogging. Further, since only one long cutting edge 7A and only one short cutting edge are formed in a ball end mill with two grooves, it is preferable that the invention be applied to a ball end mill with six or more grooves, particularly, six grooves or eight grooves.

The invention claimed is:

1. A ball end mill comprising:
   an even number of cutting edges which are formed at intervals in a circumferential direction on a front end portion of an end mill body rotated about an axis and have rotation trajectories around the axis that form a hemispherical shape having a center on the axis,
   wherein the even number of cutting edges are composed of long cutting edges and short cutting edges,
   the long cutting edges are provided in the circumferential direction with one short cutting edge interposed therebetween, and intersect with each other on the axis at a front tip of the end mill body,
   the short cutting edges are provided in the circumferential direction with one long cutting edge interposed therebetween, and include inner peripheral ends at positions distant from the axis,
   a gash of each long cutting edge and a gash of each short cutting edge connect with each other on a front end side of the end mill body, said short cutting edges being adjacent to the long cutting edges in an end mill rotation direction, and
   the gash of each long cutting edge on the front end side is wider than the gash of each short cutting edge in the circumferential direction of the end mill body.

2. The ball end mill according to claim 1,
   wherein a first circumferential interval between the long cutting edge and the short cutting edge, which is adjacent to the long cutting edge in an end mill rotation direction, is smaller than a second circumferential interval between said short cutting edge and another long cutting edge, which is adjacent to said short cutting edge in the end mill rotation direction.

3. The ball end mill according to claim 1,
   wherein the gash of each long cutting edge includes a bottom, which extends in a direction where the bottom intersects with a wall surface of the gash of each long cutting edge facing the end mill rotation direction and a wall surface thereof facing a rear side in the end mill rotation direction, or a bottom, which forms the shape of a concave surface coming into contact with these wall surfaces, at a portion where the gash of each long cutting edge is wider than the gash of each short cutting edge in the circumferential direction.

4. The ball end mill according to claim 2,
   wherein the gash of each long cutting edge includes a bottom, which extends in a direction where the bottom intersects with a wall surface of the gash of each long cutting edge facing the end mill rotation direction and a wall surface thereof facing a rear side in the end mill rotation direction, or a bottom, which forms the shape of a concave surface coming into contact with these wall surfaces, at a portion where the gash of each long cutting edge is wider than the gash of each short cutting edge in the circumferential direction.

5. The ball end mill according to claim 1, further comprising:
   a shank portion that is formed adjacent to the front end portion in the direction of the axis, wherein
   the front end side is provided on the front end portion and is located at a far side from the shank portion.

* * * * *